COMBINED TELEPHONE AND PAGING SYSTEM

Filed July 9, 1952 4 Sheets-Sheet 1

INVENTOR
NILS EMIL NILSSON
BY Frederick E. Hane
ATTORNEY

Dec. 20, 1955 N. E. NILSSON 2,727,947

COMBINED TELEPHONE AND PAGING SYSTEM

Filed July 9, 1952 4 Sheets-Sheet 2

INVENTOR
NILS EMIL NILSSON
BY Frederick L. Haury
ATTORNEY

INVENTOR
NILS EMIL NILSSON
BY Frederick E. Haney
ATTORNEY

Dec. 20, 1955 N. E. NILSSON 2,727,947

COMBINED TELEPHONE AND PAGING SYSTEM

Filed July 9, 1952 4 Sheets-Sheet 4

INVENTOR
NILS EMIL NILSSON
BY Frederick E. Hane
ATTORNEY

United States Patent Office 2,727,947

Patented Dec. 20, 1955

2,727,947

COMBINED TELEPHONE AND PAGING SYSTEM

Nils Emil Nilsson, Stockholm, Sweden, assignor to Telefonaktiebolaget L. M. Ericsson, Stockholm, Sweden, a company of Sweden Application July 9, 1952, Serial No. 297,940

Claims priority, application Sweden July 23, 1951

5 Claims. (Cl. 179—18)

The present invention relates to private automatic branch exchanges and refers to means for the paging of persons within the range of the exchange.

The object of the invention is to simplify the paging operation and reduce the costs of the means.

The invention is limited to private automatic branch exchanges of the class provided with selectors and registers within which the communications are set up by means of a marker, and within which at least part of the subscribers can be paged by means of lamp signals operated with the aid of an operating relay set, said operating relay set being called by means of a special call number and a number assigned to the paged subscriber being registered in the operating relay set, to which has furthermore been assigned a special answering number. The invention comprises means for automatic identification of each instrument calling said call-number when the relay set is free, means for registering the number of the calling instrument in means pertaining to the operating relay set, whereby said identifying means identify the instrument calling said answering number during a paging operation, and means, which thereby connect the operating relay set to the marker, the numbers of both said identified instruments being transmitted to the marker, which then sets a communication between the instruments.

The invention will be described more closely in the following with reference to Figs. 1 to 4 of the accompanying drawings.

The invention may be applied in many different manners and Fig. 1 shows three applications, Figs. 1*a*, 1*b* and 1*c*, each of which shows a typical circuit system of a private automatic branch exchange with personnel paging means according to the invention.

Figure 1A:
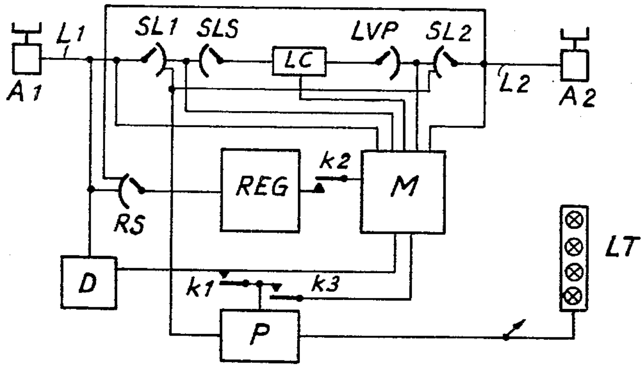

In Fig. 1*a*, two subscribers' instruments A1 and A2 are shown, which can be connected over selectors SL1, SLS, LVP and SL2 and a link circuit LC. Each subscriber's line L1 respectively L2 has a preselector SL1 respectively SL2. In the exchange, there are furthermore a register REG with register finder RS, a marker M, an identifying means D and an operating relay set P with lamp signal tables LT for the paging of persons. From the preselectors SL1 and SL2 links are connected to the selectors SLS and to the selectors LVP, though links unnecessary for the comprehension of the description have not been entered in the figure.

When the instrument A1 calls, the line L1 is connected over a register-finder RS to a register REG. When the paging of personnel is desired, a direction digit, for example 9, is dialled. The register REG connects itself over contact means *k*2 to the marker M, which connects the calling instrument A1 with the operating relay set P over the preselector SL1. The identifying means D thereby indicates the number of A1 in the marker and is simultaneously connected over contact means *k*1 to the operating relay set P for a short time, during which the number of the calling instrument is registered in the operating relay set P. The calling subscriber hears a buzzer tone emitted by set P and dials the number of the paged person. The number is registered in the operating relay set and the lamp combination assigned to the paged person glows on the lamp tables LT, which are located in different premises within the plant.

The calling subscriber may then remain with the handset close to his ear or put down the handset, if preferred. A time controlled device in the operating relay set determines the maximal time, during which the paging operation may take place.

Figure 1B:
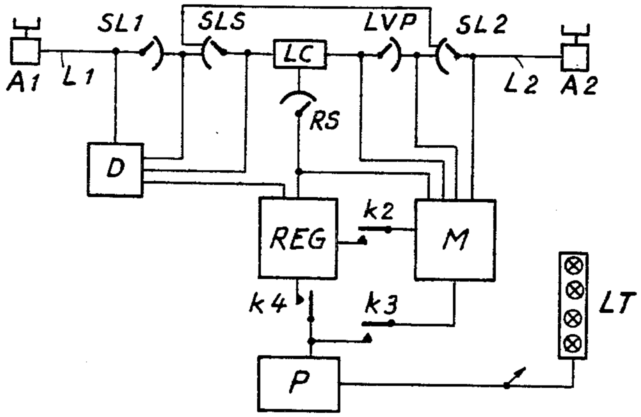

When the paged person answers, he calls from any subscriber's instrument, for example A2, is connected to a register REG over a register finder RS, and dials a direction digit, for example 8. The register REG connects itself over the contact means *k*2 to the marker M, whereby the identifying means D indicates the number of the calling instrument to the marker. At the same time the register operates the operating relay set P connecting the marker M over a contact means *k*3, whereby the number registered in the operating relay set is transmitted to the marker, which then sets up a communication between the instruments A1 and A2. The embodiment shown in Fig. 1*b* differs from that of Fig. 1*a* therein that the registers REG are connected to the link circuits LC over register finders RS, that the identifying means D in a known manner identifies and transmits the number of the calling instrument to registering means in the register REG, which receives the call either in connection with the connection of the call to the register or on demand of the register when the direction digit 9 has been received, and in that the operating relay set P is set by means of signals over circuits passing through the register REG, wherefore the calling subscriber must put down his handset during the paging operation in order to release the register REG.

The following connections are made at the paging facilities. The calling instrument A1 is connected to a register REG over the selectors SL1, SLS and RS, the identifying means D thereby selecting a free circuit LC and a free register REG, identifies the number of the calling instrument and transmits said number to the register REG. The calling subscriber dials the direction digit 9 and the register REG connects itself to the operating relay set P and transmits the number of the instrument A1 to a registering means pertaining to an operating relay set P. The calling subscriber hears the dialling tone and dials the number of the paged person. Said last mentioned number is registered in P and a lamp combination corresponding to the number glows in the lamp tables LT. The calling subscriber thereafter puts down his handset, register REG link circuit LC thereby being released, and a time control device in the operating relay set P keeps the set operated during a maximal time suitable for the paging operation.

If the paged person answers from instrument A2, the line L2 is connected over the selectors SL2 and SLS to a link circuit LC, which in its turn is connected to a register REG over a register-finder RS. The direction digit for answer at the paging facilities, for example 8, is dialled, and the register connects itself to the marker M. A contact means *k*3 connecting the operating relay set P to the marker M is hereby operated. The number of the instrument A1 registered in P is transmitted to M, which sets up a communication between A2 and A1 over the link circuit LC made busy by A2. The embodiment in Fig. 1*c* differs from that of Fig. 1*a* therein that the operating relay set P is provided with a selector PS, which can reach all the subscribers' lines L1—L2, and the position of which identifies the number of the calling subscriber. This figure furthermore shows how incoming calls on the exchange line HL are connected to the paging means.

If the instrument A1 calls, the subscriber's line L1 is connected over a register-finder RS to a register REG. The call-digit 9 is dialled and registered in the register, which connects itself over contact means *k*2 to the marker M. By means of the position of the register-finder RS the number of the calling instrument is identified and transmitted to the marker M, which sets the selector PS, the register thereby being disconnected and the calling subscriber being connected to the operating relay set P. The number of the paged person is dialled and registered in P and a lamp combination corresponding to the registration glows in the lamp tables LT.

If the paged person answers from the instrument A2, line L2 is connected over a register-finder RS to a register REG. The answering digit 8 is dialled and the register REG connected over *k*2 to the marker M. The number of the calling instrument A2 is identified by means of RS and transmitted to M simultaneously with the operating relay set P being connected to the marker M over contact means *k*3. The number of the instrument A1 is identified by means of the position of the selector PS and transmitted to the marker M, which sets up a communication between the instruments A1 and A2 over a link circuit LC. The register REG and the paging means are released.

Figure 1C:
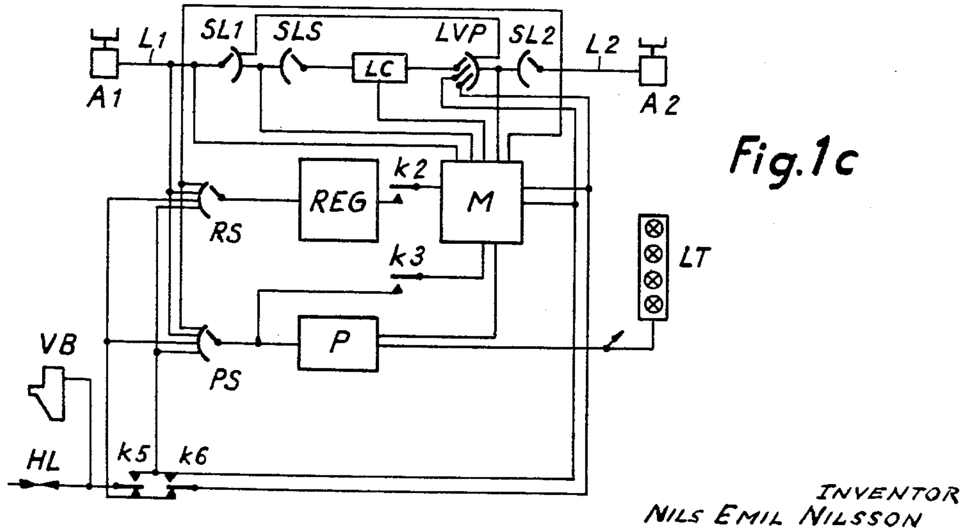

In Fig. 1*c* an exchange line HL and a switchboard VB are shown. Calls from the exchange line are connected to the switchboard VB and answered by an operator. With the help of means in the switchboard VB a register REG is connected, said register being set from the switchboard by the operator. The marker M thereafter sets up a communication between the exchange line HL and a subscriber's line, for example L2, over the selectors LVP and SL2. If no answer is received from the called instrument A2 the operator surveying the communication can interrupt the communication and start paging. A register REG is thereby connected again. The call digit 9 is dialled, the marker M connects the exchange line HL to the operating relay set P over the selector PS. The operator dials the number of the paged person and a corresponding lamp combination glows in the lamp tables LT, whereafter the operator may leave the communication. When the paged person answers, for example from the instrument A1, he is first connected to a register REG and dials the answering digit 8. The register REG is connected over the contact means *k*2 to the marker M simultaneously with the marker M being connected to the operating relay set P over the contact means *k*3. The answering instrument A1 is identified by means of the regsiter-finder RS and the exchange line is identified by means of the selector PS, whereafter the marker sets up a communication between HL and A1 over the selectors LVP and SL1.

If an answer is received from the instrument A2, but the paged person is not to be found at said number, the answering person can effect the paging. Modern exchanges are provided with means *k*5 and *k*6 for enquiries and transmission of communications within the exchange in a known manner. The answering person for example dials an impulse on his dial or pushes in a special enquiry button causing the relay set of the exchange line HL to be switched so that the line HL is disconnected in the switch contact *k*6, while the instrument A2 is connected to a register REG over the selectors SL2, LVP and RS. The call digit 9 for paging is dialled and the instrument A2 is connected to the operating relay set P over selector PS, contact *k*6 and selectors LVP and SL2. The number of the paging person in dialled on the dial of the instrument A2 and the lamp tables LT glow. The subscriber at instrument A2 ought to remain connected until an answer is obtained, but may also put down his handset, in which case the exchange line is switched over contact *k*5 to the operating relay set P and the communication with instrument A2 is released.

Let it be assumed that the subscriber at instrument A2 remains connected until the paged person answers, for example from the instrument A1. After A1 has been connected to a register REG and the answering digit 8 has been dialled, the instruments A1 and A2 are connected with each other over selectors SL1, LVP, contact *k*6, LVP, SL2. The subscriber at instrument A2 thereafter puts down his handset, whereby the communication is transmitted so that the exchange line HL is connected with instrument A1 over contact *k*5, the selectors LVP and SL1. Contact *k*6 is switched and the communication with the instrument A2 is released.

Figure 2:
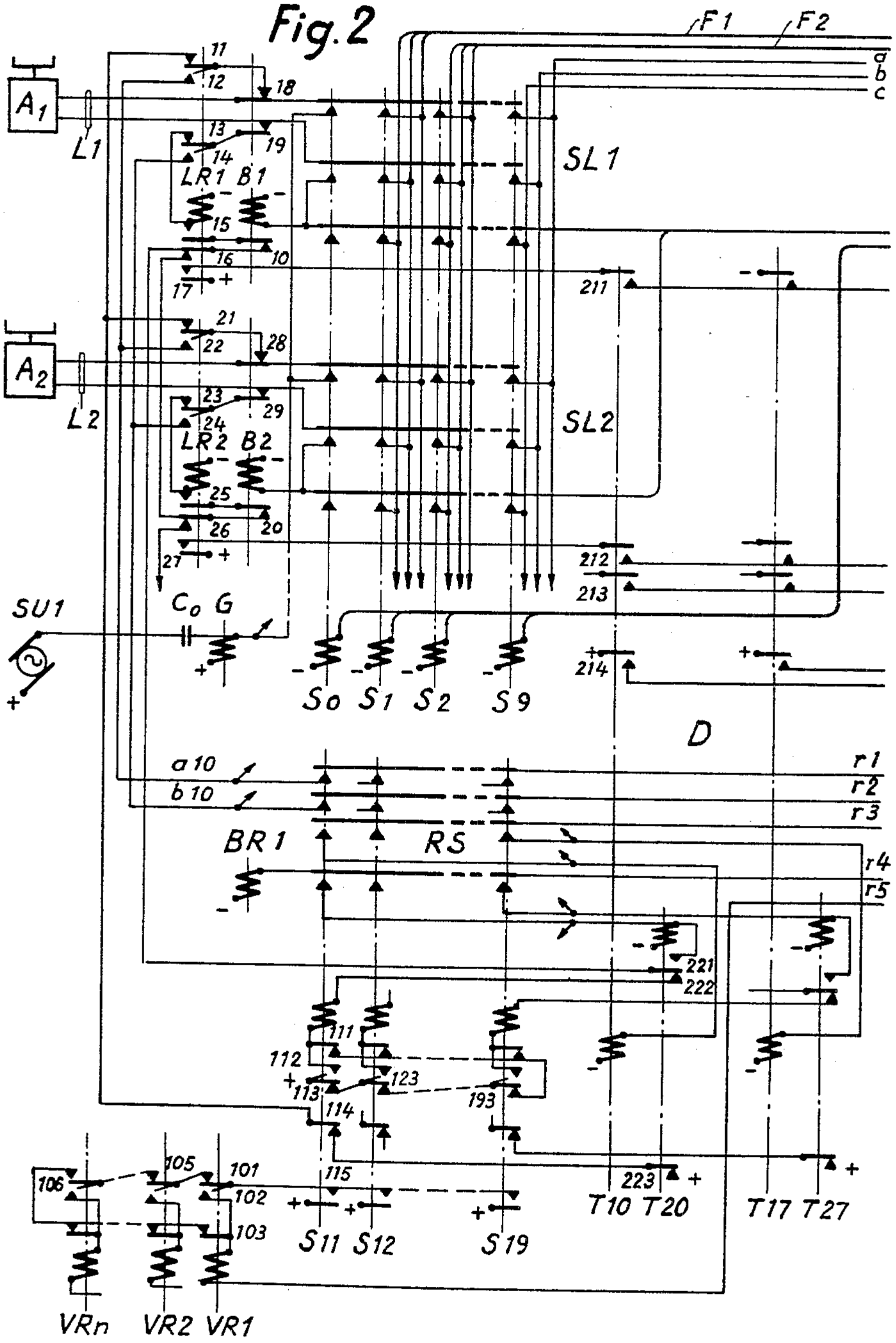
Fig. 2 shows the subscriber's line equipment and the identifying means for the embodiment according to Fig. 1*a*.
Figure 3:
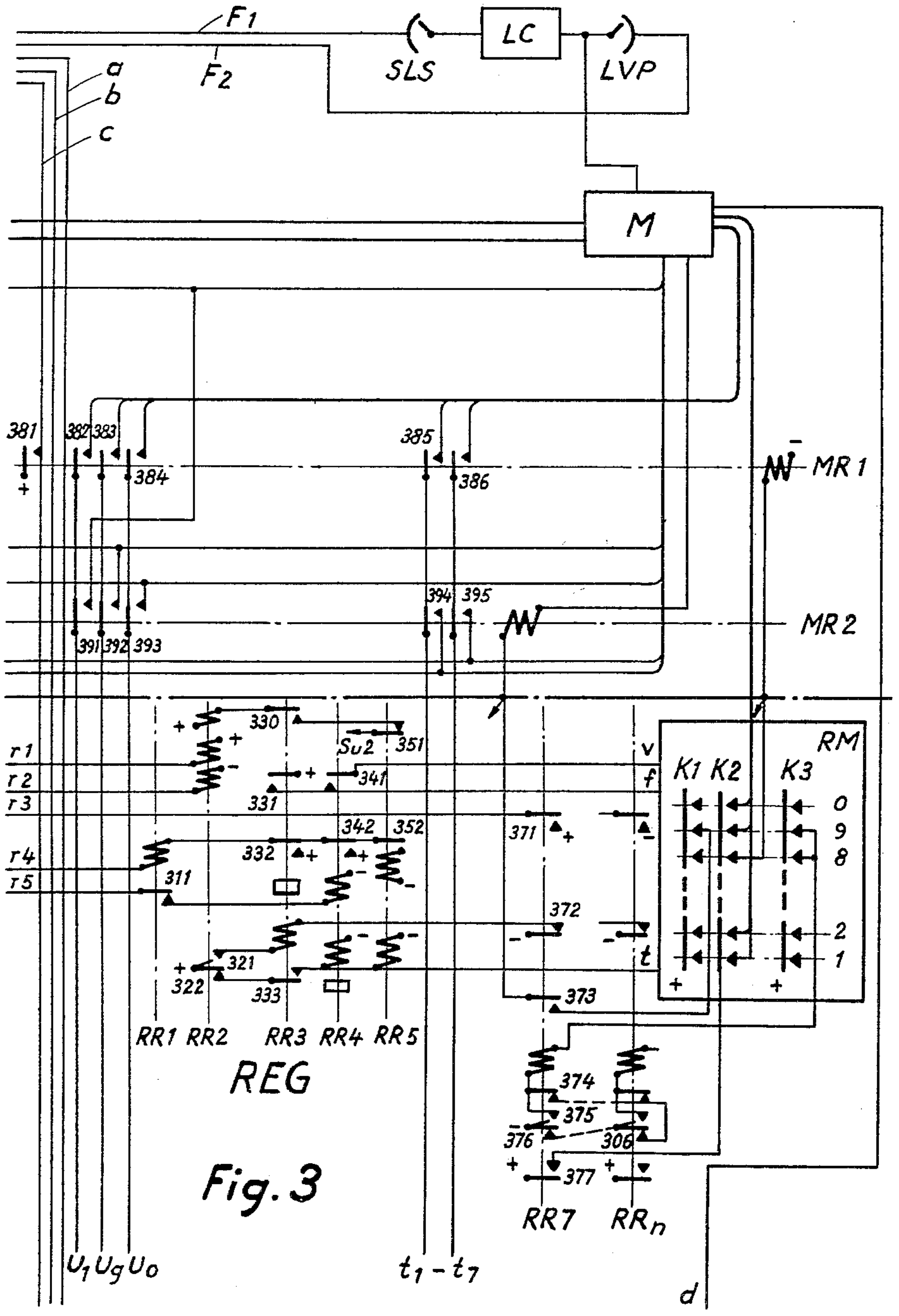
Fig. 3 shows a register for the embodiment according to Fig. 1*a*.
Figure 4:
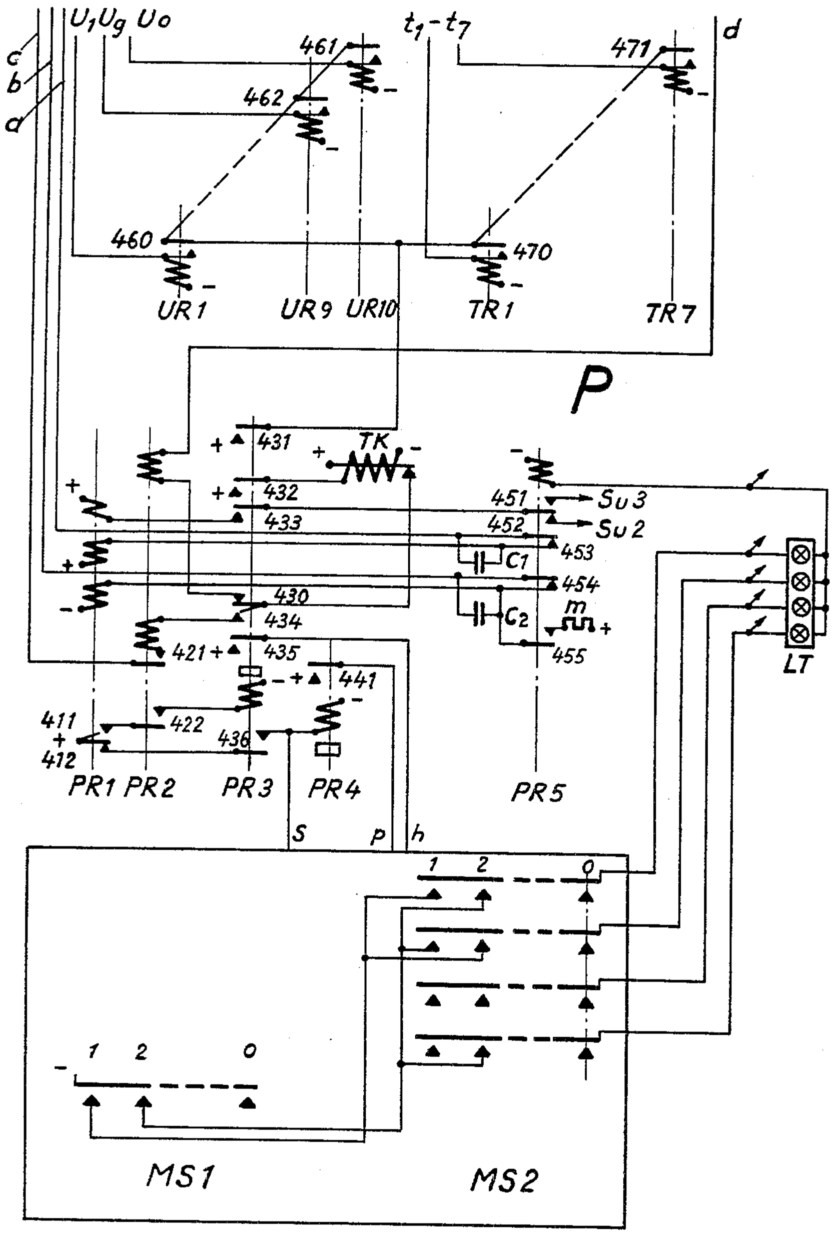
Fig. 4 shows the operating relay set for the paging of personnel according to Fig. 1*a*.

Figs. 2–4 show more in detail a connecting process for paging in a plant with 2-digit subscribers' numbers which takes place according to Fig. 1*a* with the help of crossbar switches. A special system has been used for registration, i. e. the line relays LR1, LR2 and so on pertaining to the same 10-digit form a row, in which only one relay at a time can be operated. There is one position in the multiple of the register selector RS for each 10-digit. This means that within each 10-digit only one subscriber at a time can be connected to a register, which is a drawback but entails a saving as regards the register selectors and simplifies the identification of the number of a calling subscriber's instrument. The relays T10—T17 and T20—T27 in Fig. 2 form an identifying means.

When a subscriber calls from the instrument A1 in Fig. 2 the following circuit is closed: from +, contacts 223, 114, 11 and 18, line L1 and instrument A1, contacts 19 and 13, winding on line relay LR1 to negative. Relay LR1 attracts its armature and operates contacts 11—17. The line L1 is connected over contacts 12 and 14 to two wires *a*10 and *b*10 common to the 10-digit, said wires being connected to the contacts in the register-finder RS. Relay LR1 is held in the following circuits: from +, contacts 113, 123—193, 111, winding on the selecting magnet S11, contacts 222, 10 and 15, winding on relay LR1 to negative. Selecting magnet S11 attracts its armature. Contacts 111—115 are operated. Contact 112 closes before 111 and 113 break. Contact 115 closes the following circuit for all free registers which can reach the wires *a*10 and *b*10: from +, contacts 115, 101, 105—106, 103, winding on relay VR1, wire *r*5, contact 311, the upper winding on relay RR4 to negative. Each one of the relays VR1—VR*n* pertains to a register REG and they form a relay chain in which only one relay at a time can attract. Relay VR1 attracts before relay RR4, which operates slowly. The contacts 101—103 are operated, whereby contact 102 closes before 101 and 103 break. The contacts 341—342 in Fig. 3 close. The following circuit is closed: from +, contact 342, winding on relay RR1, wire *r*4, winding on operating magnet BR1, to negative. Operating magnet BR1 and relay RR1 attract their armatures. Contact 311 breaks and the contacts in the register-finder RS corresponding to selecting magnet S11 close. Relays T20 in Fig. 2 attract their armatures in a circuit parallel to the operating magnet BR1. The contacts 221—223 are operated, whereby the circuit for selecting magnet S11 is broken. The call circuit for the line relays LR1—LR0 is hereafter kept broken in contact 223 and LR1 is kept energized over contact 221.

Relay RR2 in Fig. 3 attracts in the following circuit: from +, the upper winding on relay RR2, wire *r*1, RS, wire *a*10, contacts 12 and 18, line L1 and instrument A1, contacts 19 and 14, wire *b*10, RS, wire *r*2, the lower winding on relay RR2 to negative. The contacts 321—322 are operated. The slow-operating holding relay RR3 is energized and operates contacts 330—333. The calling subscriber hears a tone emitted from a buzzer generator *Su*2 over contacts 351 and 330.

Suppose that the call refers to paging and the direction digit 9 is dialled. The impulses are repeated by relay RR2 and current impulses emitted over contact 322 and 333 and wire $t$ to a registering mechanism RM. At the beginning of the first impulse relays RR4 and RR5 attract. Relay RR5 disconnects the buzzer generator S$u$2 and is held over contact 352. Relay RR4 is slow-operating and remains attracted until the end of the impulse train. In a circuit over contacts 331 and 341 and wire $v$ a switching means is operated, which separates the impulse trains from each other, and in a circuit over contact 331 and wire $f$ the registering is kept in the registering mechanism RM.

When the digit 9 is registered in RM as the first digit the contacts on the contact rows K1—K3 indicated by 9 close. The following circuit is closed for connection of the register REG to the marker M: from +, contact row K3 position 9, winding on relay RR7, contacts 374, 306—376, to negative. The relays RR7—RR$n$ pertain each to a register and form a relay chain, in which only one relay at a time can be operated. Let it be assumed that relay RR7 attracts its armature and actuates the contacts 371—377, whereby contact 375 closes before contacts 374 and 376 break. Contact 372 breaks the circuit for relay RR3. During the release time for relay RR3 the following connections take place: Contact 371 closes a circuit for relay T10 in Fig. 2 over wire $r$3. Relay T10 operates contacts 211—214. Simultaneously, relays MR2 in Fig. 3 attract in a circuit over contacts 373 and K1 position 9. Contacts 391—395 close. The relays MR1—MR2 are common for all the registers. Relay MR1 connects the operating relay set P to the marker M and relay MR2 connects P to the identifying means D in Fig. 2.

The number of the calling instrument A1 is identified with + over contacts 17 and 211 and + over contact 214 and registered in the marker M. At the same time the following circuits are closed: from +, contacts 17, 211 and 391, wire $u$1, winding on relay UR1 in Fig. 4 to negative and +, contacts 214, and 394, wire $t$1, winding on relay TR1 to negative. Relays UR1 and TR1 operate their contacts 460 respectively 470. Simultaneously the digit 9 is marked in the marker M over contact 377 and the contact row K2 position 9, whereafter the marker tests over wire $d$ to ascertain whether the operating relay set P is free. Relay PR2 in Fig. 4 attracts its armature and operates the contacts 421—422.

The selecting magnet S9 in Fig. 2 and the operating magnet B1 are operated from the marker M. The operating magnet B1 actuates the contacts 18, 19 and 10 and close the contacts in the operating bar for cross-bar switches SL1 corresponding to the selecting magnet S9. The subscriber's line L1 is thereby connected to the operating relay set P over wires $a$, $b$, $c$. The register is disconnected from line L1 by the contacts 18—19 and the following circuit is closed: from + in Fig. 4, the intermediate winding on relay PR1, contact 453, wire $a$, SL1, line L1 and the instrument A1, SL1, wire $b$, contact 454, the lower winding on relay PR1 to negative. Relay PR1 actuates the contacts 411—412. Relay PR3 is energized and actuates the contacts 430—436.

When relay RR3 in Fig. 3 releases its armature, the register mechanism R$m$ is restored, the circuit for relay RR7 is broken and the marker M and the identifying means D are released, whereafter relays UR1 and TR1 in Fig. 4 are held energized over contact 431. The subscriber's line L1 is held connected to the operating relay set P through the following circuit: from +, thermocontact TK, contact 434, the lower winding on relay PR2, contact 421, wire $c$, contact in the operating bar SL1, winding on the operating magnet B1 to negative. The thermocontact TK is heated with current over contact 432 and the calling subscriber hears a buzzer tone sent from a buzzer generator S$u$2 over the contacts 452 and 433.

The calling subscriber dials the number of the paged person, whereby relay PR1 repeats the impulses of the dial and current impulses are emitted over contacts 412 and 436 and wire S to a registering mechanism MS1—MS2, which occupies two digits. The switching between the digits is attended to by relay PR4, which is slow operating and attracts at the beginning of each impulse train and remains energized until the end of the impulse train. Relay PR4 closes contact 441 and emits a current impulse per digit over wire $p$. The registering mechanism is kept energized in the set position over contact 435 and wire $h$. When two digits have been registered, for example 22, a lamp combination in the lamp-tables LT glows, said tables being here supposed to comprise 4 lamps. For number 22 the upper and the lower lamps in the tables glow. Relay PR5 is hereby energized and actuates contacts 451—455. The buzzer generator S$u$2 is disconnected and a new tone emitted from a buzzer generator S$u$3, is connected by contact 451, whereby the calling subscriber is informed that paging takes place. The current feeding the calling instrument A1 is broken by contacts 453—454 and the condensers C1—C2 are connected. Relay PR1 is kept in a circuit over resistance $m$ and contact 455. The subscriber may thereafter put down his handset. The paging takes place until the paged person answers or the thermo-contact TK releases.

Let it be assumed that the paged person answers from the subscriber's instrument A2 in Fig. 2. The line relay LR2 attracts its armature and the contacts 21—27 are operated. The connections are similar to those described above in response to call from the instrument A1 with the exception that the holding circuit for LR2 will pass over contact 16 on LR1. The subscriber's line L2 is connected to a register REG over a register-finder RS. The subscriber at A2 dials in this case the number 8 and relay RR7 connects the register to the marker M and actuates the identifying means D. The number of the calling instrument is marked in the marker with + over contacts 27 and 212 and 214 simultaneously with relay MR1 being operated in the following circuit: from +, contact 377, contact row K2 position 8, winding on relay MR1 to negative. The contacts 381—386 close. Contact 381 short circuits relay PR2 in Fig. 4, which releases its armature. The contacts 421—422 open and relay PR3 is deenergized. During the release time for relay PR3 two circuits are closed from + over contacts 431, 460 and 470, wires $u$1 and $t$1, contacts 382 and 385 to relays in the marker M, which registers the number of the instrument A1 stored up in the operating relay set P. The marker M thereafter sets up a communication between the instrument A1 and the instrument A2 over the operating bar for cross-bar switches SL1, a link F1, a selector SLS, a link circuit LC, a selector LVP, a link F2 and the operating bar for cross-bar switches SL2. The links F1 and F2 are determined by means of the selecting magnets S1 and S2 and the operating magnets B1 and B2 are operated by means of the identified numbers of the instruments A1 and A2. The register REG and the operating relay set P are released.

If the operating relay set P is busy, when called by means of the direction digit 9, the marker M connects the calling instrument A1 to a buzzer generator S$u$1 in Fig. 2, whereby first the selecting magnet S$o$ and then the operating magnet B1 are operated. The following circuit is closed: from +, winding on the choke coil G, the upper contact row on the operating bar for cross-bar switches SL1, line L1, instrument A1, the intermediate contact row on SL1, the winding on operating magnet B1 to negative. The buzzer tone from the buzzer generator S$u$1 passes the condenser C$o$.

I claim:

1. The combination of paging means and a telephone system comprising at least two subscriber lines, selector switches, at least one register and associated marker, switch means connecting a calling subscriber with said register for setting the register in accordance with the number of a called line, switch means for connecting the register to said marker for transmitting the called number thereto, identifying means including switch means between said calling line and said register for identifying said calling line to said marker whereby said marker actuates said selector switches to connect said calling and called lines, an operating device including registering means connected with said marker, means in said marker responsive to a signal from said calling line for connecting said calling line to said operating device, signal means connected with and responsive to said operating device, means in said operating device for signalling said calling line to indicate connection of said calling line with said operating device, means on said calling line for transmitting signals designating a person to be called, said operating device responding to the last said signals to actuate said signal means and including means responding to the call of said designated person, said identifying means identifying the calling line to said marker whereby said marker establishes communication between the called person on one subscriber line and said calling subscriber line.

2. The combination according to claim 1 further including means responsive to the identifying means for setting the register in accordance with the number of the calling line, means connecting the register and operating device by a call from the called number to transmit the number of the called line to said register, and time control means for holding the operating device a predetermined time after the register is released.

3. The combination of a paging system having an operating device responsive to a called number and an answering number and signalling means responsive to said operating device and an automatic telephone system comprising at least two subscriber lines, said combination comprising selector switches, at least one register, marking means, switch means for connecting a calling line to said register to set it in accordance with a called number, means connecting the register and marker for transmitting the called number to the marker, identification means for identifying the calling line to the marker, said marker and said selector switches functioning to establish communication between the calling and called lines, primary registering means, a relay connecting said primary registering means and said identification means in response to a call to said called number, said identification means responding to set the primary registering means in accordance with the number of the calling line and said marker connecting the calling line to said operating device, secondary registering means in said operating device responsive to signals from the calling line in accordance with the designation of a person being paged, signalling means responsive to the operating device for signalling a paged person to call the answering number, said identification means identifying the line calling the answering number to the marker, and a second relay connecting the primary registering means to the marker in response to a call to the answering number, said marker establishing communication between the line calling the answering number and the first said calling line.

4. The combination according to claim 3 further including a time control means associated with said operating device for releasing said device a predetermined time after said signalling.

5. The combination according to claim 1, wherein said primary registering means comprises an auxiliary selector switch connected with said operating device and responsive to the marker upon a call to said called number to complete a signalling circuit, the position of said auxiliary selector switch indicating the number of the calling line.

References Cited in the file of this patent

UNITED STATES PATENTS

| | | |
|---|---|---|
| 2,167,725 | Pfaff | Aug. 1, 1939 |
| 2,335,524 | Lomax | Nov. 30, 1943 |
| 2,496,629 | Lamberty et al. | Feb. 7, 1950 |